United States Patent
Kashyap et al.

(10) Patent No.: US 10,511,163 B2
(45) Date of Patent: Dec. 17, 2019

(54) LOW CAPACITANCE SURGE SUPPRESSION DEVICE

(71) Applicant: General Electric Company, Schenectady, NY (US)

(72) Inventors: Avinash Srikrishnan Kashyap, Niskayuna, NY (US); Christian M. Giovanniello, Clifton Park, NY (US); Christopher Fred Keimel, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 438 days.

(21) Appl. No.: 14/982,735

(22) Filed: Dec. 29, 2015

(65) Prior Publication Data

US 2017/0187181 A1 Jun. 29, 2017

(51) Int. Cl.
| | |
|---|---|
| *H01C 7/12* | (2006.01) |
| *H02H 1/00* | (2006.01) |
| *H02H 1/04* | (2006.01) |
| *H02H 3/22* | (2006.01) |
| *H02H 9/06* | (2006.01) |
| *H02H 9/00* | (2006.01) |
| *H02H 9/04* | (2006.01) |

(52) U.S. Cl.
CPC .............. *H02H 9/005* (2013.01); *H02H 9/04* (2013.01)

(58) Field of Classification Search
CPC ................................. H02H 9/04; H02H 9/005
USPC .......................................................... 361/118
See application file for complete search history.

(56) References Cited

U.S. PATENT DOCUMENTS

| | | | |
|---|---|---|---|
| 6,411,482 B1* | 6/2002 | Funke | H02H 3/048 361/58 |
| 6,421,220 B2 | 7/2002 | Kobsa | |
| 6,867,436 B1 | 3/2005 | Matteson et al. | |
| 7,164,568 B2 | 1/2007 | Walters | |
| 8,144,445 B2 | 3/2012 | Caggiano et al. | |
| 8,169,000 B2 | 5/2012 | Chuang et al. | |
| 8,338,854 B2 | 12/2012 | Bobde et al. | |
| 8,835,976 B2 | 9/2014 | Kashyap et al. | |
| 2006/0238940 A1* | 10/2006 | Komulainen | H02M 1/32 361/91.1 |
| 2006/0279376 A1* | 12/2006 | Ehlers | H03H 11/245 333/81 R |
| 2008/0217749 A1 | 9/2008 | Matteson et al. | |
| 2009/0272634 A1* | 11/2009 | Ehlers | H01H 59/0009 200/181 |

(Continued)

OTHER PUBLICATIONS

Dai, S., Lin, C., King, Y., "Low Voltage Transient Voltage Suppressor with V-Groove Structure," Reliability Physics Symposium, 2008. IRPS 2008. IEEE International, pp. 278-282, Apr. 27-May 1, 2008.

*Primary Examiner* — Thienvu V Tran
*Assistant Examiner* — Lucy M Thomas
(74) *Attorney, Agent, or Firm* — Ziolkowski Patent Solutions Group, SC

(57) ABSTRACT

A surge suppression device includes a micro electromechanical system (MEMS) switch electrically connected to a current path. Additionally, the surge suppression device includes a transient voltage suppression (TVS) device electrically connected in series to the MEMS switch. The surge suppression device is configured to protect electronic components from voltage surges or current surges.

20 Claims, 4 Drawing Sheets

(56) References Cited

U.S. PATENT DOCUMENTS

2012/0190332 A1* 7/2012 Charles .............. G06Q 20/3229
455/410

* cited by examiner

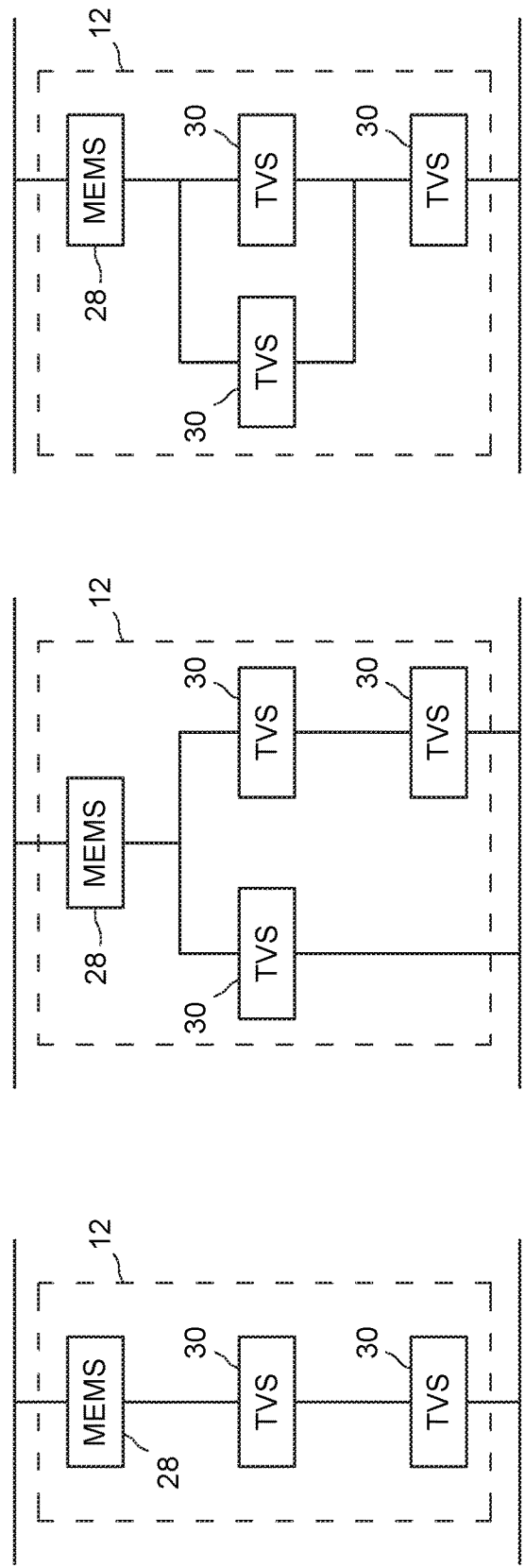

LOW CAPACITANCE SURGE SUPPRESSION DEVICE

BACKGROUND

The subject matter disclosed herein relates to transient voltage suppression devices or surge protection devices for protecting electronic circuitry.

A variety of systems, such as communication systems, power generation systems, and power distribution systems, include electronic equipment that may be exposed to transients. Transients, as used herein, generally refer to momentary surges in voltage or current that may damage or interfere with electronic equipment. Transients may be caused by lightning strikes, electromagnetic interference, electrostatic discharge, sudden load changes, or power supply fluctuations, for example.

A transient voltage suppression (TVS) device, also referred to as a surge protection device or surge protector, is an electronic component that is used to protect electronic equipment from transients. For example, TVS devices may protect electronic components by attenuating transient voltage or current or by diverting transient voltage or current away from the electronic equipment. Silicon TVS devices often have desirable surge suppression characteristics and have conventionally been used to protect electric equipment from transients. However, silicon TVS devices may generate high leakage currents as the temperature increases. For example, silicon TVS devices may be undesirable or unsuitable for use when the ambient temperature is high, such as when the ambient temperature reaches 225 degrees Celsius (° C.), due to the high leakage current. In addition, silicon TVS devices may have a relatively high capacitance, which may distort high frequency signals. As such, silicon TVS devices may be undesirable or unsuitable for use in high frequency and high temperature applications.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the present disclosure. Indeed, the disclosed techniques may encompass a variety of forms that may be similar to or different from the embodiments set forth below.

In one embodiment, a surge suppression device includes a micro electromechanical system (MEMS) switch electrically connected to a current path. Additionally, the surge suppression device includes a transient voltage suppression (TVS) device electrically connected in series to the MEMS switch.

In one embodiment, a surge suppression circuit includes a current path electrically connected to processing circuitry. The surge suppression circuit also includes a micro electromechanical system (MEMS) switch electrically connected to the current path. The MEMS switch is configured to switch between an open state and a closed state. Additionally, the surge suppression circuit includes a transient voltage suppression (TVS) device electrically connected to the MEMS switch in series. The MEMS switch and the TVS device are electrically connected to the processing circuitry in parallel. Further, the MEMS switch is configured to allow current to flow from the current path to the TVS device when the MEMS switch is in the closed state and to block the flow of current from the current path to the TVS device when the MEMS switch is in the open state.

In one embodiment, a system includes a controller including processing circuitry and an electrical conduit configured to transfer a signal to the controller. Additionally, the system includes a surge suppression circuit electrically connected to the electrical conduit and electrically connected to the controller in parallel. The surge suppression circuit includes a micro electromechanical system (MEMS) switch configured to switch between an open state and a closed state. Additionally, the surge suppression circuit includes a transient voltage suppression (TVS) device electrically connected to the MEMS switch in series. The MEMS switch is configured to allow current to flow from the electrical conduit to the TVS device when the MEMS switch is in the closed state and to block the flow of current from the electrical conduit to the TVS device when the MEMS switch is in the open state.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIGS. 4A-4C are schematic block diagrams of various configurations of a surge suppression device that includes a MEMS switch and two or more TVS devices in series with the MEMS switch, in accordance with embodiments of the present techniques.

DETAILED DESCRIPTION

Figure 1:
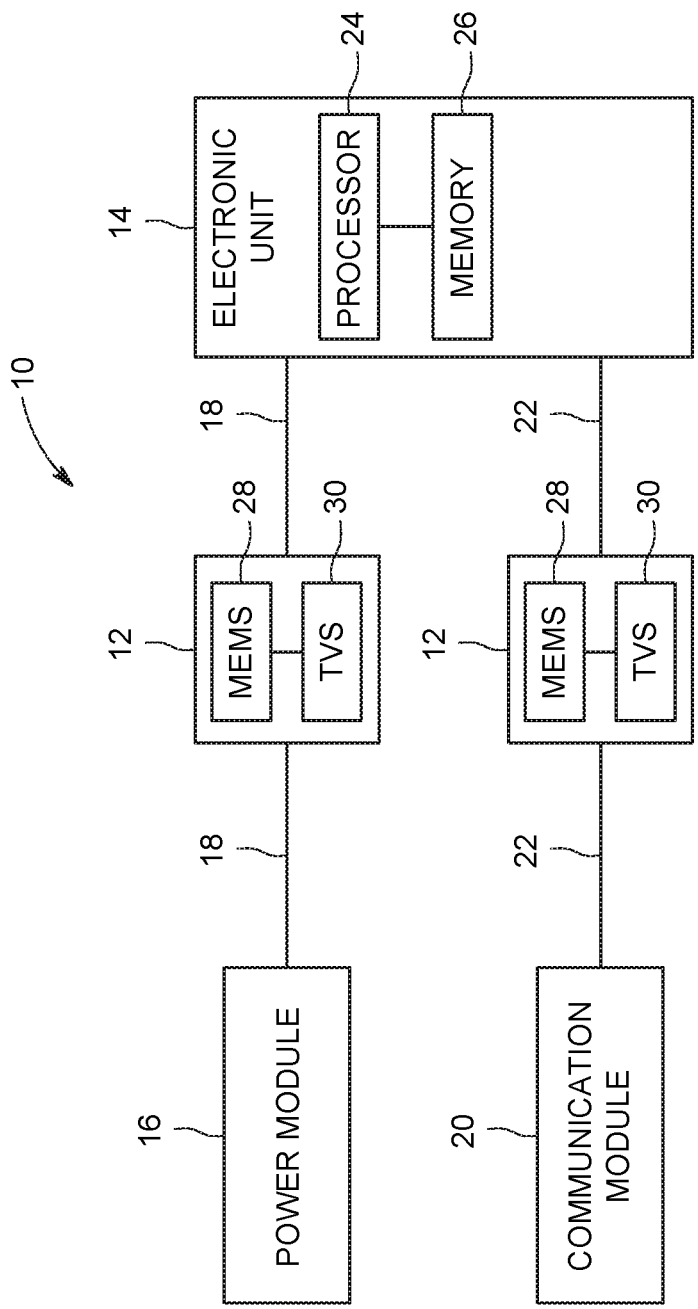
FIG. 1 is a schematic block diagram of a system including an electronic unit and surge suppression devices designed to protect the electronic unit from transients, in accordance with embodiments of the present techniques.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. As used herein, the terms "voltage surge" and "transient voltage" may be used interchangeably to indicate an unexpected or excessive increase in voltage compared to an average voltage across the system. Additionally, as used herein, the terms "current surge" and "transient current" may be used interchangeably to indicate an unexpected or excessive increase in current compared to an average current across the system. Further, as used herein, the terms "surge" or "transient" may be used to refer to transient voltage or transient current.

Present embodiments are directed toward a surge suppression device including a micro electromechanical system (MEMS) switch connected in series with and upstream from a transient voltage suppression (TVS) device. The surge suppression device may be connected in parallel with electronic components to protect the electronic components from voltage surges (also referred to as transient voltage) and/or current surges (also referred to as transient current). The MEMS switch includes a movable actuator that is selectively movable between a closed or conducting state and an open or non-conducting state. As discussed in greater detail below, the MEMS switch facilitates current flow through the MEMS switch to the TVS device when the MEMS switch is in the closed state. When the MEMS switch is in the open state, the MEMS switch creates an open circuit to reduce, block, or prevent current flow to the TVS device. As a result, the MEMS switch reduces the capacitance and the leakage current of the TVS device when the MEMS switch is in the open state. As such, the disclosed surge suppression device may have improved performance characteristics relative to previous TVS devices and, in particular, may have improved performance characteristics relative to previous TVS devices in high temperature systems and/or high frequency systems.

With the foregoing in mind, FIG. 1 illustrates an embodiment of a system 10 including a plurality of suppression devices 12 (e.g., surge suppression circuits, surge suppression assemblies, etc.) that are designed to protect at least one electronic unit 14 (e.g., a controller, protected circuitry, etc.) from transient voltage and/or transient current. For example, the system 10 may include a power generation system, a power distribution system, a communication system (e.g., a telecommunication system), a medical system, an aviation system (e.g., an aircraft), or any combination thereof. In certain embodiments, the system 10 or various components of the system 10, such as the one or more suppression assemblies 12 and/or the one or more electronic units 14, may be exposed to high temperatures as a result of environmental and/or operational conditions. For example, the system 10 or various components of the system 10, such as the one or more suppression assemblies 12 and/or the one or more electronic units 14, may be configured operate at temperatures between approximately 150 and 300° C. or greater.

In certain embodiments, the system 10 may include a power module 16 that provides power to the electronic unit 14 via a power supply bus 18 (e.g., electrical conduit, current path, etc.). For example, the power module 16 may include a power supply and/or electronic circuitry that generally generate, receive, filter, store, and/or transmit power. Further, in some embodiments, the system 10 may include a communication module 20 (e.g., electrical conduit, current path, etc.) that transmits data signals (e.g., analog signals, digital signals, radio-frequency signals, high speed radio-frequency signals, etc.) to the electronic unit 14 via a communication channel 22. For example, the communication module 20 may include a transceiver and/or electronic circuitry configured to generate, receive, filter, store, and/or transmit data. In some embodiments, the power module 16 and the communication module 20 may be integrated in a single unit. It should be appreciated that the system 10 may include other components in addition to (or instead of) the power module 16 and/or the communication module 20, and the components and configuration of the system 10 may vary depending on the nature of the application of the system 10. For example, while the power module 16 and the communication module 20 are connected to the same electronic unit 14 in the illustrated embodiment, the power module 16 and the communication module 20 may be connected to different electronic units 14 in other embodiments.

During operation of the system 10, transients may be induced onto the power supply bus 18 and/or the communication channel 20. Transients may result from lightning strikes, electromagnetic interferences, electromagnetic pulses, solar flares, electrostatic discharge, sudden load changes, or power supply fluctuations, for example. The transients, if not mitigated or diverted, may damage or negatively affect the electronic unit 14. For example, the electronic unit 14 may include electronic circuitry (e.g., protected circuitry, processing circuitry, control circuitry, etc.), one or more processors 24, and/or one or more memory devices 26 that may be sensitive to and damaged by transients. The one or more memory devices 26 may include tangible and non-transitory machine-readable media (e.g., random access memory, read only memory, flash memory, etc.) configured to store data and code or instructions for implementing processes of the system 10, which may be read and executed by the one or more processors 24 (e.g., special-purpose processors, application specific integrated circuits, etc.).

To protect or block the electronic unit 14 from transients, the one or more surge suppression devices 12 may be connected to the electronic unit 14. For example, as illustrated, one surge suppression device 12 is connected to the power supply bus 18 and the electronic unit 14, while another surge suppression device 12 is connected to the communication channel 20 and the electronic unit 14. Each surge suppression device 12 may include at least one micro electromechanical system (MEMS) switch 28 and at least one transient voltage suppression (TVS) device 30. As described in more detail below, the MEMS switch 28 may facilitate the flow of current to the TVS device 30 when the MEMS switch 28 is in a conducting or closed state, and the MEMS switch 28 may reduce, block, or prevent flow of current to the TVS device 30 when the MEMS switch 28 is in a non-conducting or open state. When the MEMS switch 28 is in the conducting state, transients may flow through the MEMS switch 28 to the TVS device 30, which may protect or block the electronic unit from transients 14. For example, as described in more detail below, the TVS device 30 may divert such transients away from the electronic unit 14 to protect the electronic unit 14 from damage.

Figure 2:
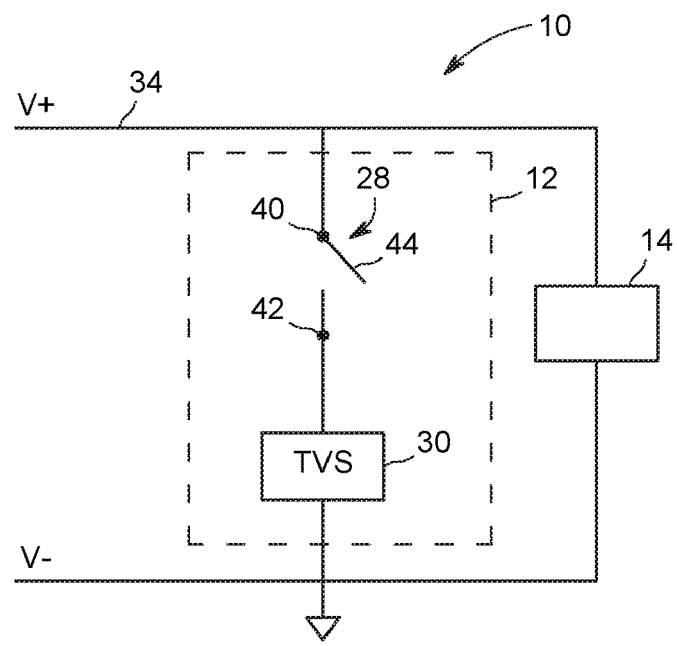
FIG. 2 is a schematic diagram of a configuration of a surge suppression device including a micro electromechanical system (MEMS) switch in series with a transient voltage suppression (TVS) device, in accordance with embodiments of the present techniques.

For example, FIG. 2 illustrates an embodiment of the surge suppression device 12 (e.g., surge suppression circuit, surge suppression assembly, etc.) including one MEMS switch 28 connected to one TVS device 30. For the illustrated embodiment, the surge suppression device 12 is electrically connected to a protected line 34 (e.g., a current path, electrical conduit, the power supply bus 18, the communication channel 20, etc.) that facilitates flow of current (e.g., a power and/or communication signal) to the electronic unit 14. The surge suppression device 12 includes the MEMS switch 28, which is electrically connected to the protected line 34 and is electrically connected to the TVS device 30 in series. Further, the surge suppression device 12 is connected to the electronic unit 14 in parallel. In some embodiments, the surge suppression device 12 may be a single package (e.g., the MEMS switch 28 and the TVS device 30 may be disposed on the same substrate). In other embodiments, the surge suppression device 12 may include two or more packages.

As illustrated, the MEMS switch 28 may include a first contact 40 (sometimes referred to as a source or input contact), a second contact 42 (sometimes referred to as a drain or output contact), and at least one movable actuator 44 (sometimes referred to as a beam, actuating element, or actuating electrode). The movable actuator 44 may move (e.g., bend) under applied forces, such as electrostatic attraction, magnetic attraction and repulsion, or thermally induced differential expansion. Actuation of the movable actuator 44 may establish contact with the second contact 42. In certain embodiments, the contact established between the movable actuator 44 and the second contact 42 facilitates the flow of current (e.g., from the protected line 34) from the first contact 40 to the second contact 42, and this state (e.g., condition) may be referred to as a conducting state, a closed state, or an on state of the MEMS switch 28. When contact has not been established between the movable actuator 44 and the second contact 42, this state may be referred to as a non-conducting state, an open state, or an off state of the MEMS switch 28. During the non-conducting state, the first and second contacts 40 and 42 may not be electrically coupled, and flow of current from the first contact 40 to the second contact 42 may be reduced, blocked, or prevented.

Thus, the MEMS switch 28 may facilitate flow of current from the protected line 34 to the TVS device 30 when the MEMS switch 28 is in the conducting (closed) state. As noted above, the TVS device 30 may protect the electronic unit 14 from damage due to transients. In some embodiments, the TVS device 30 may be configured to attenuate the transient and/or to divert the transient away from the electronic unit 14. In some embodiments, the TVS device 30 may be a voltage clamping TVS device 30. For example, such a clamping TVS device 30 conducts and shunts excess current (e.g., to ground) once the voltage applied to the clamping TVS device 30 reaches or exceeds its breakdown voltage, then restores to a non-conducting mode when the applied voltage falls below the breakdown voltage. Specifically, the breakdown voltage (sometimes referred to as threshold voltage) is the voltage at which the TVS device 30 will effectively turn on or begin to conduct and shunt current. In operation, current increases rapidly and the voltage is effectively clamped after the voltage applied to the clamping TVS device 30 reaches the breakdown voltage of the clamping TVS device 30.

In some embodiments, the clamping TVS device 30 may be configured to operate in a punch-through mode, an avalanche mode, or combinations thereof, when the applied voltage reaches the breakdown voltage. As used herein, the term "punch-through mode" means that the clamping TVS device 30 operates using "punch-through" physics, also known as "reach-through" physics, such that as the voltage across the clamping TVS device 30 is increased, a depletion region extends across the clamping TVS device 30, and large amounts of current are able to flow through the clamping TVS device 30. The clamping TVS device 30 may be configured to maintain this condition with minimal change in the voltage across it. As used herein, the term "avalanche mode" refers to the process in which semiconductors sustain an electrical field internal to a region or regions of the device, whereby the process of ionization starts to occur, leading to carrier multiplication. The clamping TVS device 30 may maintain this condition, if desired; however, this typically involves a non-linear increase in current above the breakdown voltage of the clamping TVS device 30, and large increase in current may occur, which may heat the clamping TVS device 30.

In certain embodiments, the clamping TVS device 30 may include a metal-oxide varistor (MOV), a polymer varistor, a zener diode, an avalanche diode, or combinations thereof. In some embodiments, the clamping TVS device 30 may include a semiconductor assembly. For example, the clamping TVS device 30 may be fabricated from silicon, zinc oxide, gallium oxide, one or more wide band gap materials, or combinations thereof. The one or more wide band gap materials may include silicon carbide, gallium nitride, diamond, aluminum nitride, or boron nitride. In some embodiments, the clamping TVS device 30 may be fabricated from one or more wide band gap materials and may reliably operable in high temperatures, such as temperatures between approximately 150° C. and 500° C. In certain embodiments, the clamping TVS device 30 may include three or more semiconductor layers or regions. For example, the clamping TVS device 30 may include a first semiconductor region (e.g., layer) having a first conductivity type, a second semiconductor region having a second conductivity type and in electrical contact with the first semiconductor region, and a third semiconductor region having the first conductivity type and in electrical contact with the second semiconductor region. The conductivity of a semiconductor material is indicative of the majority and minority charge carriers in the semiconductor material. For example, an n-type semiconductor material includes negative charge carriers (e.g., electrons) as majority charge carriers and positive charge carriers (e.g., holes) as minority charge carriers. A p-type semiconductor material includes positive charge carriers as majority charge carriers and negative charge carriers as minority charge carriers. In some embodiments, the first conductivity type is p-type, and the second conductivity type is n-type. In other embodiments, the first conductivity type is n-type, and the second conductivity type is p-type. Further, the TVS clamping device 30 may be unidirectional or bi-directional.

A crowbar TVS device is a different type of TVS device that is configured to divert transients. A crowbar TVS device switches to a low voltage, low impedance state when the voltage applied to the crowbar TVS device reaches its breakdown voltage, then restores to a non-conducting mode when the applied voltage falls below a holding or extinguishing level. The crowbar TVS devices may include gas discharge tubes, spark gaps, thyristors, or thryristor surge protective devices. Crowbar TVS devices may have various disadvantages as compared to clamping TVS devices. For example, once crowbar TVS devices are in the conducting mode, it may be difficult to switch back to the non-conducting mode. Additionally, gas discharge tubes, which are conventionally used in telecommunication systems (e.g., high speed, radio-frequency telecommunication systems), may have a slower response time and may be less reliable relative to clamping TVS devices. However, the present techniques are also applicable to crowbar TVS devices, and in some embodiments, the TVS device 30 may be a crowbar TVS device.

When the TVS device 30 is in the non-conducting mode (e.g., the applied voltage is below the breakdown voltage), the TVS device 30 may appear "transparent" to the protected line 34. That is, the TVS device 30 may substantially operate as an open circuit in the non-conducting mode, although some leakage current may occur. For example, some TVS devices 30, such as silicon-based TVS devices 30, may generate undesirably high levels of leakage current (e.g., greater than 0.1 microamp (μA) or greater than 1 μA) in high temperature applications (e.g., 150° C. or greater). As such, some TVS devices 30, such as silicon-based TVS devices 30, may be undesirable or unsuitable for use in high temperature applications if the leakage current is not reduced.

By providing the MEMS switch 28, the leakage current of the TVS device 30 may be reduced or eliminated, even in high temperatures applications (e.g., 150° C. or greater). In particular, the MEMS switch 28 reduces the leakage current of the TVS device 30 when the MEMS switch 28 is in the non-conducting state, because the MEMS switch 28 reduces, blocks, or prevents flow of current from the protected line 34 to the TVS device 30 when the MEMS switch 28 is in the non-conducting (open) state. For example, when the TVS device 30 is connected to the MEMS switch 28 in series and the MEMS switch 28 is in the non-conducting (open) state, the leakage current of the TVS device 30 may be reduced by at least 60%, 70%, 75%, 80%, 85%, 90%, 95%, 99%, 99.5%, or more. In certain embodiments, the leakage current of the TVS device 30 may be reduced by approximately 1 to 6 orders of magnitude when the MEMS switch 28 is in the non-conducting (open) state. In some embodiments, the leakage current of the TVS device 30 when the MEMS switch 28 is in the non-conducting state may be less than approximately 0.1 microsiemens (μS), 0.05 μS, 0.01 μS, 0.005 μS, 0.001 μS, 0.0005 μS, or substantially negligible.

Further, the MEMS switch 28 reduces the capacitance of the TVS device 30 when the MEMS switch 28 is in the non-conducting (open) state, because the MEMS switch 28 reduces, blocks, or prevents flow of current from the protected line 34 to the TVS device 30 in that state. Some TVS devices 30, such as semiconductor TVS devices 30, may have relatively high levels of capacitance (e.g., 1 nanofarad (nF) or greater), which may distort high frequency signals. In some embodiments, when the MEMS switch 28 is in the non-conducting state, the capacitance of the TVS device 30 may be reduced by at least 80%, 85%, 90%, 95%, 99%, 99.5%, or more. In certain embodiments, the capacitance of the TVS device 30 may be reduced by approximately 1 to 6 orders of magnitude when the MEMS switch 28 is in the non-conducting state. Further, in some embodiments, the capacitance of the TVS device 30 when the MEMS switch 28 is in the non-conducting state may be less than approximately 1 nF, 0.5 nF, 0.1 nF, 0.05 nF, 0.01 nF, 0.005 nF, 0.001 nF, or substantially negligible. As such, the surge suppression device 12 may be suitable for use in systems including high frequency signals, such as telecommunication systems.

Accordingly, when transients are not present, it may be desirable for the MEMS switch 28 to be in the non-conducting (open) state to reduce the leakage current and the capacitance of the TVS device 30. Additionally, when transients are present, it may be desirable for the MEMS switch 28 to quickly be switched to the conducting state so that transients are routed to the TVS device 30, which may protect the electronic unit 14 from the transients. In one embodiment, the MEMS switch 28 may be constructed such that transients cause the movable actuator 44 to move and establish contact with the second contact 42. For example, the breakdown voltage of the MEMS switch 28 (e.g., the voltage applied to the first and second contacts 40 and 42 that causes the movable actuator 44 to move and close) may be less than and relatively close to (e.g., within 5% or 10%) of a threshold voltage indicative of transients. However, switching the MEMS switch 28 in this manner may be unreliable and difficult to control. To establish a high level of control over the switching of the MEMS switch 28, a gate signal may be provided to the MEMS switch 28 that switches the MEMS switch 28 from the non-conducting state to the conducting state and vice versa.

Figure 3:
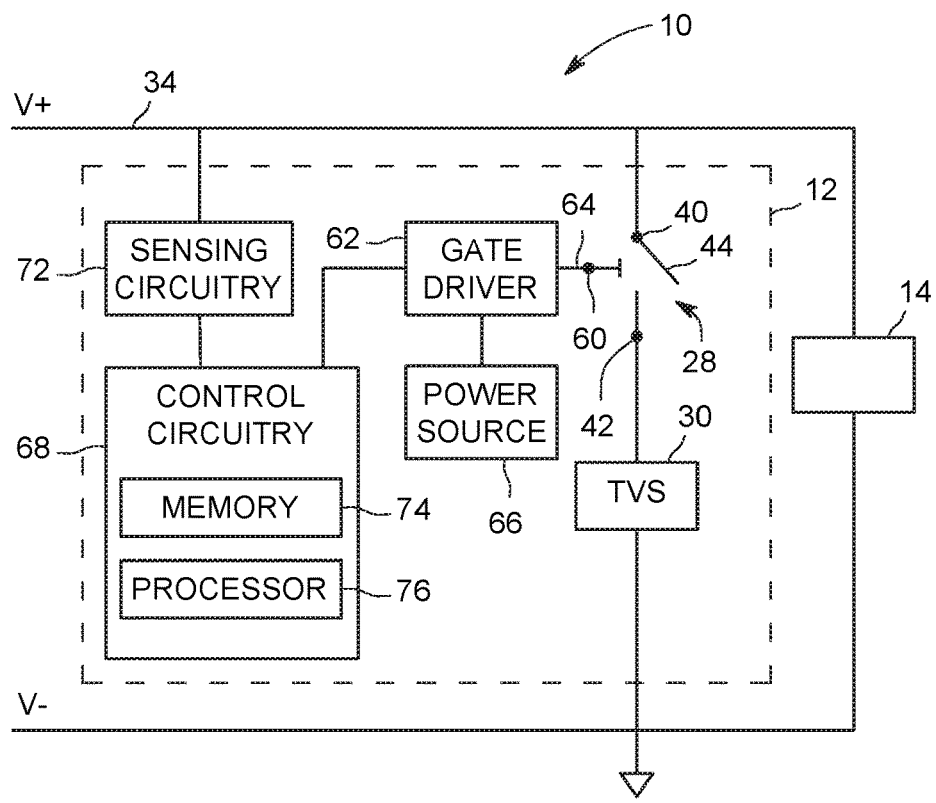
FIG. 3 is a schematic diagram of a configuration of a surge suppression device including a MEMS switch, a TVS device in series with the MEMS switch, and control circuitry that controls actuation of the MEMS switch, in accordance with embodiments of the present techniques.

For example, as illustrated in FIG. 3, the MEMS switch 28 may include a third contact 60 configured as a gate. The third contact 60 may be controlled by a gate driver 62, which may be configured to generate and provide a gate signal 64 to the third contact 60 to switch the state of the MEMS switch 28. For example, in one embodiment, the gate signal 64 may impart an attraction force on the moveable actuator 44 that pulls the moveable actuator toward the third contact 60, and as a result, toward the second contact 42. The attraction force may be an electrostatic force, a magnetic force, a piezoresistive force, or a combination thereof. The gate driver 62 may be powered by a power source 66.

The gate driver 62 may be controlled by control circuitry 68. The control circuitry 68 may determine whether to switch the present state of the MEMS switch 28 (e.g., from a non-conducting state to a conducting state or vice versa) and may provide control signals to the gate driver 62 to cause the gate driver 62 to generate the gate signal 64. In some embodiments, the control circuitry 68 may determine whether to switch the state of the MEMS switch 28 based on a detected or expected transient in the signal (e.g., power and/or communication signal) traversing the protected line 34 (e.g., a current path, the power supply bus 18, the communication channel 22, etc.) to the electronic unit 14. In some embodiments, the control circuitry 68 may detect transients in the protected line 34 based on the magnitude or the rate of change of the voltage and/or current in the signal. For example, sensing circuitry 72 (e.g., current sensor and/or voltage sensor) may sense the current and/or voltage in the protected line 70 and provide signals to the control circuitry 68 indicative of the sensed current and/or voltage. In some embodiments, the control circuitry 68 may then compare the sensed current to a current threshold and may subsequently provide a control signal to the gate driver 62 to generate the gate signal 64 if and when the sensed current is greater than the current threshold. Additionally or alternatively, the control circuitry 68 may compare the sensed voltage to a voltage threshold and may then provide a control signal to the gate driver 62 to generate the gate signal 64 if and when the sensed voltage is greater than the voltage threshold.

In some embodiments, the current threshold and the voltage threshold may be predetermined minimum values for transients within the system 10. For example, if a voltage above 500 volts (V) is considered a transient for the system 10, the predetermined voltage threshold may be 500 V. In certain embodiments, the current threshold and the voltage threshold may be less than the predetermined minimum values for a transient of the system 10. In some embodiments, the current threshold and the voltage threshold may be a percentage of the predetermined minimum values for a transient. For example, if a voltage above 500 V is considered a transient for the system 10, the voltage threshold may be 75%, 80%, 85%, 90%, 95%, or any other suitable percentage of 500 V. In such embodiments, the current threshold and/or the voltage threshold may be values associated with a likely or expected future transient. As such, the MEMS switch 28 may be switched to the conducting state when a transient is likely or expected to occur soon. It may be desirable to route the signal to the TVS device 30 when a transient is likely or expected to occur soon to reduce the likelihood of very rapid transients reaching the electronic unit 14.

The control circuitry 68 may continue to monitor the current and/or voltage during the transient to determine when to switch the MEMS switch 28 from the conducting state to the non-conducting state. In some embodiments, the control circuitry 68 may switch the MEMS switch 28 to a non-conducting (open) state when the control circuitry 68 determines that a transient has ended. For example, the control circuitry 68 may provide a control signal to the gate driver 62 to generate the gate signal 64 when the sensed current falls below the current threshold or when the sensed voltage falls below the voltage threshold. In some embodiments, the control circuitry 68 may provide a control signal to the gate driver 62 to generate the gate signal 64 when the sensed current or voltage is below the respective threshold for a predetermined period of time, when the sensed current or voltage falls below the respective threshold by a predetermined amount, or a combination thereof.

In some embodiments, the current threshold and/or the voltage threshold may be stored in a memory 74 (e.g., a read-only memory, random-access memory, flash memory, etc.), and the control circuitry 68 may include a processor 76 (e.g., processing circuitry) configured to read the current threshold and/or the voltage threshold from the memory 74. Further, the memory 74 may store code for implementing the present techniques, such as code for comparing the sensed current or voltage to the respective threshold, and the processor 76 may be configured to read and execute the code stored in the memory 74. Additionally, in some embodiments, the control circuitry 68, the sensing circuitry 72, the gate driver 62, and/or the power source 66 may be integrated in a single unit. Further, in some embodiments, the control circuitry 68, the sensing circuitry 72, the gate driver 62, and/or the power source 66 may be disposed on the same substrate as the MEMS switch 28.

While the embodiments of the surge suppression device 12 described above include one TVS device 30, in other embodiments, the surge suppression device 12 may include more than one TVS device 30 to accommodate various currents and voltages for different applications. For example, FIGS. 4A, 4B, and 4C illustrate different embodiments of the surge suppression device 12 that include at least two TVS devices 30. As illustrated in FIG. 4A, the surge suppression device 12 may include two TVS devices 30 in series with one another, and in series with the MEMS switch 28. Additionally, as illustrated in FIG. 4B, the surge suppression device 12 may include three TVS devices 30 in a series configuration with the MEMS switch 28, where two of the TVS devices 30 are in series configuration that is in parallel with the third TVS device 30. Further, as illustrated in FIG. 4C, the surge suppression device 12 may include three TVS devices 30 in a series configuration with the MEMS switch 28, where two of the TVS devices 30 are in parallel configuration that is in series with the third TVS device 30. It should be appreciated that the surge suppression device 12 may include any suitable number of TVS devices 30 in any suitable combination to provide a desired current carrying capacity and voltage performance for various applications.

Figure 5A:
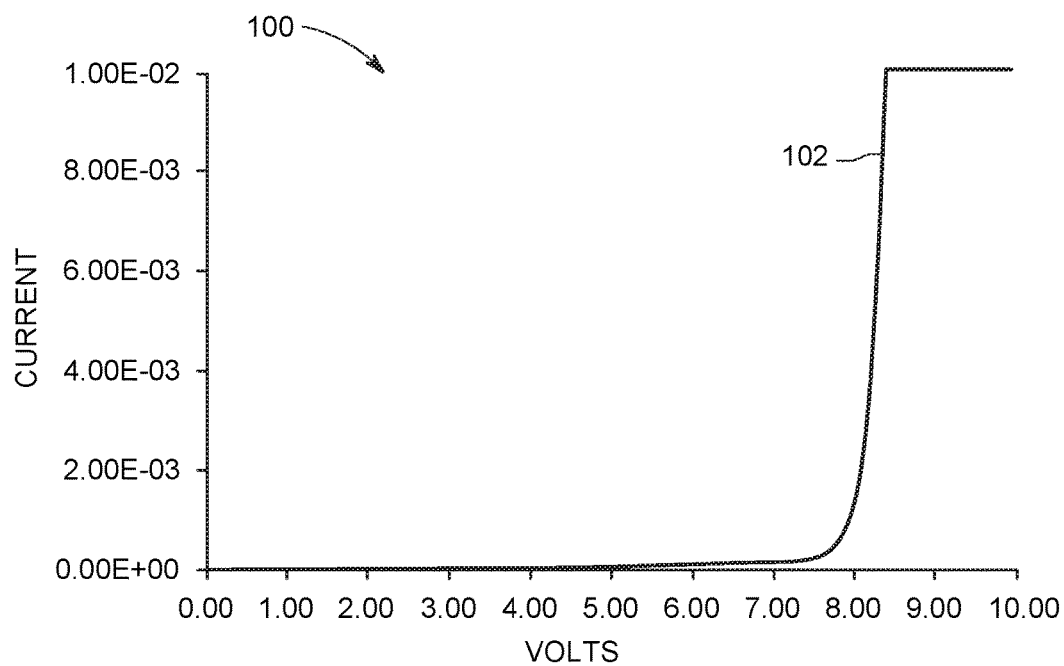
FIGS. 5A-5B are graphs illustrating current-voltage characteristics of a TVS device and current-voltage characteristics of a surge suppression device including a TVS device in series with a MEMS switch, in accordance with embodiments of the present techniques.
Figure 5B:
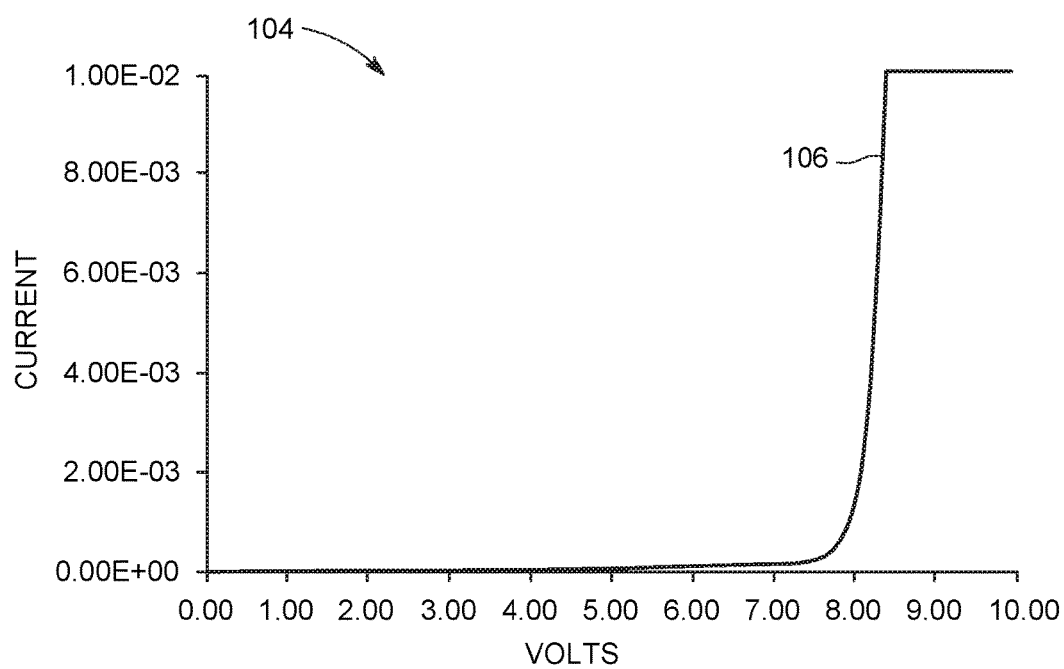

FIGS. 5A and 5B illustrate the output current and voltage characteristics for the TVS device 30 and for the surge suppression device 12. In particular, FIG. 5A is a graph 100 illustrating a curve 102 that represents the current-voltage characteristics of the TVS device 30 (i.e., the TVS device 30 alone, not connected in series to the MEMS switch 28). Additionally, FIG. 5B is a graph 104 illustrating a curve 106 that represents the current-voltage characteristics of the surge suppression device 12 including the MEMS switch 28 (e.g., in the conducting (closed) state) and the TVS device 30 connected in series with the MEMS switch 28. As illustrated, the TVS device 30 and the surge suppression device 12 both turn on at approximately 8 V, where the curves 102 and 106 are substantially flat despite the rising voltage. At voltages less than approximately 8 V, the TVS device 30 and the surge suppression device 12 (i.e., the TVS device 30 in the surge suppression device 12) are both in an off or non-conducting state. Therefore, in addition to providing reduced leakage current and capacitance, the surge suppression device 12 of the presently disclosed designs does not substantially change the breakdown voltage (e.g., the threshold voltage) of the TVS device 30.

Technical effects of the invention include providing a surge suppression system, including a MEMS switch in series with a TVS device, that provides protection for electrical devices from transients without significantly diminishing performance of the device during normal operation. In particular, the disclosed surge suppression devices reduce or eliminate the leakage current and capacitance of the TVS device when the MEMS switch is in a non-conducting (open) state, while the breakdown voltage of the TVS device remains substantially unchanged when the MEMS switch is in the conducting (closed) state. By reducing or eliminating the leakage current of the TVS device, the disclosed surge suppression devices may be used in high temperatures, such as temperatures between approximately 150 and 500° C., or greater, without significant impacts on performance when transients are not present. Additionally, by reducing the capacitance of the TVS device, the disclosed surge suppression devices may be used for high frequency applications, such as high speed, radio-frequency telecommunication systems, without significant impacts on performance when transients are not present.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A surge suppression device, comprising:
   a micro electromechanical system (MEMS) switch electrically connected to a current path;
   a voltage clamping transient voltage suppression (TVS) device electrically connected in series to the MEMS switch, wherein the MEMS switch is configured to switch between an open state and a closed state, the MEMS switch is configured to facilitate current flow from the current path to the voltage clamping TVS device when the MEMS switch is in the closed state, and the MEMS switch is configured to block current flow from the current path to the voltage clamping TVS device when the MEMS switch is in the open state, and a capacitance of the voltage clamping TVS device is reduced by at least 80% when the MEMS switch is in the open state; and a control circuitry operatively coupled to the MEMS switch and configured to control switching of the MEMS switch based on a measured level of current or a measured level of voltage in the current path, wherein the control circuitry is configured to switch the MEMS switch from the open state to the closed state when the measured level of current is greater than a current threshold or when the measured level of voltage is greater than a voltage threshold;

wherein the current threshold and voltage threshold comprise one of:
- a minimum value of transient current or transient voltage in the current path that defines a transient surge current or transient surge voltage; or
- a pre-defined percentage of the minimum value of transient current or transient voltage in the current path that defines a transient surge current or transient surge voltage.

2. The surge suppression device of claim 1, wherein a leakage current of the voltage clamping TVS device is reduced by at least 60% when the MEMS switch is in the open state.

3. The surge suppression device of claim 1, comprising a second voltage clamping TVS device electrically connected to the MEMS switch in series, wherein the second voltage clamping TVS device is electrically connected to the voltage clamping TVS device in parallel or in series.

4. The surge suppression device of claim 1, wherein the current path is electrically connected to processing circuitry, and the MEMS switch and the voltage clamping TVS device of the surge suppression device are electrically connected to the processing circuitry in parallel.

5. The surge suppression device of claim 1, wherein the voltage clamping TVS device comprises silicon, silicon carbide, zinc oxide, gallium oxide, gallium nitride, diamond, aluminum nitride, or boron nitride.

6. The surge suppression device of claim 1, wherein the voltage clamping TVS device operates using a punch-through mode, an avalanche mode, or a combination thereof.

7. The surge suppression device of claim 1, wherein the voltage clamping TVS device comprises a metal-oxide varistor.

8. The surge suppression device of claim 1, wherein the voltage clamping TVS device comprises a zener diode.

9. The surge suppression device of claim 1, wherein the voltage clamping TVS device comprises a clamping TVS device.

10. The surge suppression device of claim 1, wherein the voltage clamping TVS device comprises a crowbar TVS device.

11. A surge suppression circuit, comprising:
a current path electrically connected to protected circuitry;
a micro electromechanical system (MEMS) switch electrically connected to the current path, wherein the MEMS switch is configured to switch between an open state and a closed state;
a transient voltage suppression (TVS) device electrically connected to the MEMS switch in series, wherein the MEMS switch and the TVS device are electrically connected to the protected circuitry in parallel, and the MEMS switch is configured to allow current to flow from the current path to the TVS device when the MEMS switch is in the closed state and to block the flow of current from the current path to the TVS device when the MEMS switch is in the open state; and a control circuitry operatively coupled to the MEMS switch and configured to control switching of the MEMS switch based on a measured level of current or a measured level of voltage in the current path, wherein the control circuitry is configured to switch the MEMS switch from the open state to the closed state when the measured level of current is greater than a current threshold or when the measured level of voltage is greater than a voltage threshold;

wherein the current threshold and voltage threshold comprise one of:
- a minimum value of transient current or transient voltage in the current path that defines a transient surge current or transient surge voltage; or
- a pre-defined percentage of the minimum value of transient current or transient voltage in the current path that defines a transient surge current or transient surge voltage.

12. The surge suppression circuit of claim 11, wherein the TVS device comprises silicon, silicon carbide, zinc oxide, gallium oxide, gallium nitride, diamond, aluminum nitride, or boron nitride.

13. The surge suppression circuit of claim 11, wherein a capacitance of the TVS device is reduced by at least 95% when the MEMS switch is in the open state.

14. The surge suppression circuit of claim 11, wherein a leakage current of the TVS device is reduced by at least 90% when the MEMS switch is in the open state.

15. A system, comprising:
a controller comprising processing circuitry;
an electrical conduit configured to transfer a signal to the controller;
a surge suppression circuit according to claim 11 electrically connected to the electrical conduit and electrically connected to the controller in parallel.

16. The system of claim 15, wherein the signal comprises a radio-frequency communication signal.

17. The system of claim 16, wherein the TVS device comprises silicon, silicon carbide, zinc oxide, gallium oxide, gallium nitride, diamond, aluminum nitride, or boron nitride.

18. The system of claim 17, wherein a capacitance of the TVS device is reduced by at least 80% when the MEMS switch is in the open state.

19. The surge suppression circuit of claim 11, wherein the TVS device comprises a voltage clamping TVS device.

20. The surge suppression circuit of claim 11, wherein the TVS device comprises a crowbar TVS device.

* * * * *